United States Patent [19]
Hageman et al.

[11] Patent Number: 5,709,087
[45] Date of Patent: Jan. 20, 1998

[54] POWER BRAKE APPLY SYSTEM

[75] Inventors: John Benjamin Hageman, Vandalia; Schuyler Scott Shaw, Dayton; Donald Edward Schenk, Vandalia, all of Ohio

[73] Assignee: General Motors Corporation, Detroit, Mich.

[21] Appl. No.: 682,343

[22] Filed: Jul. 18, 1996

[51] Int. Cl.[6] .................................................. B60T 13/20
[52] U.S. Cl. .................................................. 60/556; 91/460
[58] Field of Search .......................... 60/555, 556; 91/460

[56] References Cited

U.S. PATENT DOCUMENTS

| | | |
|---|---|---|
| 4,072,011 | 2/1978 | Ewald ........................... 60/555 |
| 4,463,562 | 8/1984 | Taft ............................ 60/556 |
| 4,732,002 | 3/1988 | Farr ............................ 60/556 |

FOREIGN PATENT DOCUMENTS 2099526  12/1982  United Kingdom ................ 91/460

*Primary Examiner*—F. Daniel Lopez
*Attorney, Agent, or Firm*—Jeffrey A. Sedlar

[57] ABSTRACT

A power brake apply system includes a master cylinder having a piston for generating fluid pressure within a braking circuit. A boost valve assembly is mounted adjacent the master cylinder and carries a slidable spool that selectively closes off a normal path of communication between a fluid reservoir and the boost chamber of the master cylinder in response to the manual actuation of the master cylinder's piston as effected through a pressurized braking circuit. After closure of communication between the reservoir and the boost chamber a power fluid supply is opened to the boost chamber to provide power assist in the actuation of the master cylinder's piston.

12 Claims, 4 Drawing Sheets

POWER BRAKE APPLY SYSTEM

BACKGROUND OF THE INVENTION

The present invention relates to a power brake apply system and more particularly, to a power brake apply system having an hydraulically boosted master cylinder.

Power brake apply systems are conventionally known wherein a brake pedal is connected through a push rod to a power head operating on vacuum or hydraulic power. The manual application of force on the brake pedal is transferred through the push rod to the power head which boosts or increases the amount of force transferred through the power brake apply system under the operation of vacuum assist or hydraulic power. The power head in turn applies the intensified force to a master cylinder assembly which draws fluid from an associating reservoir and applies fluid pressure to the braking system.

With such a conventional system the functions of the power head and master cylinder are separate. The power head operates to effect an output force on a push rod that is greater than, and in proportion to, the input force applied by the manually actuated push rod. The master cylinder operates independently to pressurize fluid chambers and to communicate the fluid pressure through the braking circuit to the vehicle's wheel brakes.

SUMMARY OF THE INVENTION

A power brake apply system in accordance with the present invention includes a master cylinder assembly that, in effect, includes the power head for effecting a boost or power assist to the manual application of force in actuating the master cylinder to pressurize a braking circuit. The master cylinder includes a piston that is slidably carried in a bore to pressurize a fluid chamber and an interconnected braking circuit. A boost valve assembly is engaged with or commonly formed as part of the master cylinder's body and includes a slidable spool that is movable in response to actuation of the master cylinder's primary piston. Movement of the master cylinder's primary piston in response to the manual application of force to a brake pedal effects movement of the boost valve's spool such that a pressurized fluid source is communicated to the backside of the primary piston of the master cylinder providing a power assist in the actuation of the master cylinder by applying manual force to the brake pedal.

According to a preferred embodiment of the present invention which is described in greater detail herein, a power brake apply system includes a master cylinder with a master cylinder body having a bore that slidably carries the piston. A high pressure chamber is defined on one side of the master cylinder's piston which is open to a braking circuit to communicate pressurized fluid for actuation of the wheel brakes of the braking circuit during movement of the master cylinder's piston. A boost valve assembly is engaged with or formed as an integral part of the master cylinder's body. The boost valve assembly carries a slidable spool and is engaged with a fluid reservoir.

A first passage extends through the boost valve assembly and opens to the reservoir. A second passage also extends through the boost valve assembly and opens to the bore of the master cylinder which carries the piston. A third passage extends into the boost valve assembly and communicates with a power operated pump and accumulator which provides a pressurized fluid source. The braking circuit which is in communication with the high pressure chamber of the master cylinder includes a line that opens to the boost valve assembly on an end of the slidable spool.

In accordance with this preferred embodiment of the present invention, upon the movement of the master cylinder's piston in response to the manual application of force thereto, fluid pressure generated in the high pressure chamber adjacent the piston is communicated through the braking circuit to the end of the slidable spool of the boost valve assembly to effect movement thereof. Movement of the slidable spool closes off communication between the reservoir and the master cylinder through the boost valve assembly.

In response to movement of the slidable spool, the third passage is open to the second passage such that the power fluid supply generated by the pump is communicated through the boost valve assembly to the master cylinder on the backside of the piston. This pressurized fluid source provides a power assist in movement of the piston and in pressurizing fluid within the high pressure chamber of the master cylinder and the associated braking circuit. Accordingly, the control of the resultant hydraulic boost and the master cylinder pressure application to the braking circuit is integrated into a single unit that operates on a common fluid.

DETAILED DESCRIPTION OF THE PRESENTLY PREFERRED EMBODIMENT

Figure 1:
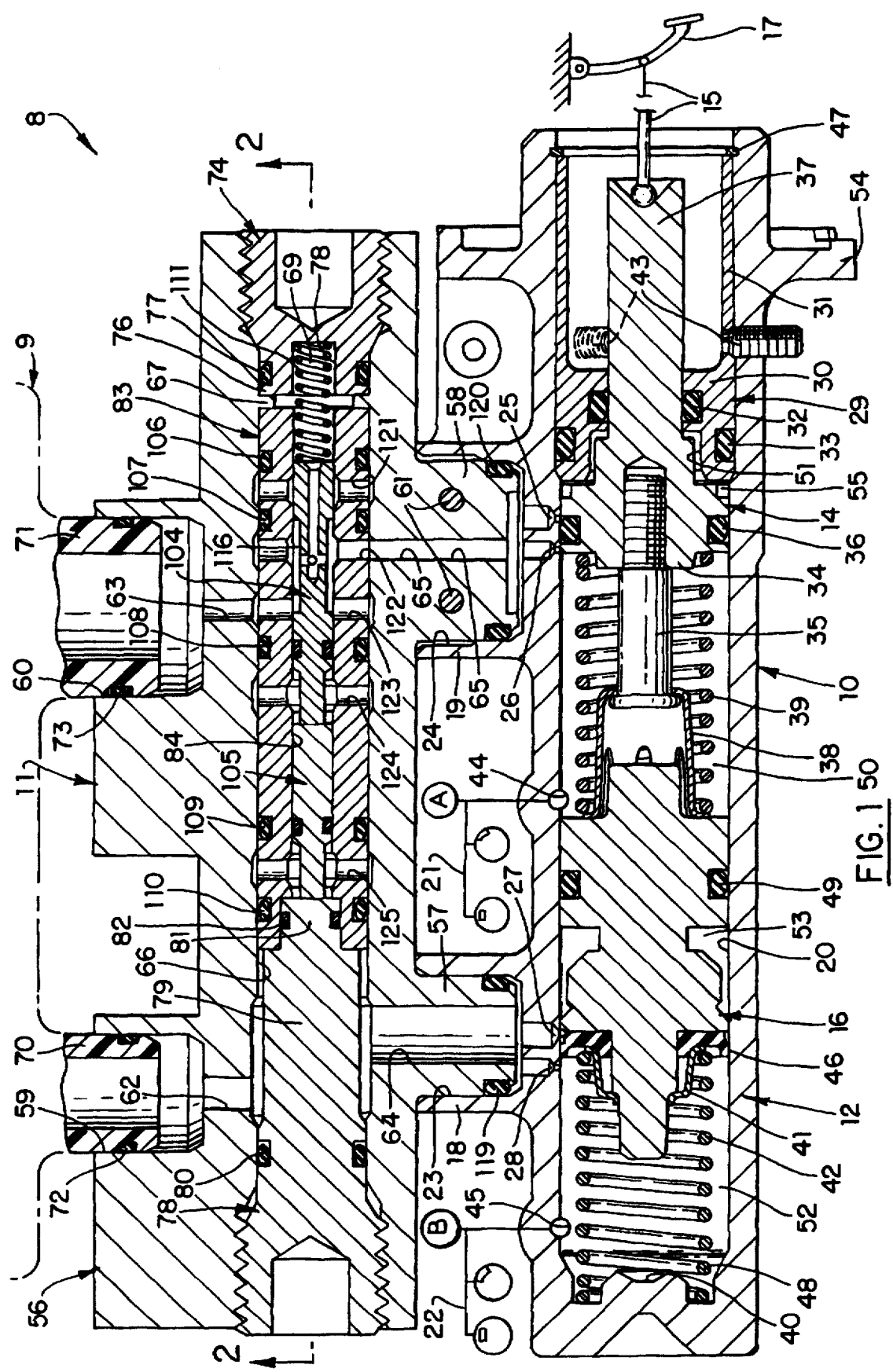
FIG. 1 is a fragmentary cross sectional illustration of a power brake apply system.

Referring to the drawings, illustrated in FIG. 1 is a power brake apply system designated in the aggregate as 8. In general, the power brake apply system 8 includes a master cylinder assembly 10 with an associating boost valve assembly 11 and a fluid reservoir 9. A brake pedal actuator 17 and a push rod 15 transfer a manual application of force to the power brake apply system 8.

The master cylinder assembly 10 includes a master cylinder body 12 formed of an acceptably rigid material such as metal or plastic, with an annular flange 54 for mounting purposes. The master cylinder assembly 10 is directly responsive to the application of force to pedal 17 through the push rod 15.

A longitudinal bore 20 extends through body 12 and slidably carries a dual piston arrangement including primary piston 14 and secondary piston 16. The primary piston 14 is arranged in a subassembly that includes a spring retainer 38 which is slidably retained on piston extension 34 by means of fastener 35. A return spring 39 is carried between spring retainer 38 and primary piston 14 about piston extension 34. The primary piston subassembly also includes a seal 36 carried in a circumferential groove of primary piston 14. Seal 36 of primary piston 14 defines a movable boundary of primary high pressure chamber 50 in longitudinal bore 20. A shaft 37 extends from primary piston 14 and directly engages push rod 15. The primary piston 14 is operable to selectively pressurize a braking circuit 21, through the outlet opening 44.

Secondary piston 16 is substantially spool-shaped and is slidably carried in longitudinal bore 20 forward of primary piston 14. Secondary piston 16 is engaged by spring retainer 38 of the primary piston subassembly. A spring retainer 41 is carried on secondary piston 16 and a return spring 42 extends between the spring retainer 41 and the annular spring seat 48 in end 40 of the longitudinal bore 20 biasing the secondary piston 16 toward the primary piston 14. The return spring 39 operates to maintain a maximum separation between the primary piston 14 and the secondary piston 16 dependent upon resultant fluid pressures within the longitudinal bore 20.

Secondary piston 16 carries a primary seal 46 fluidly separating longitudinal bore 20 into secondary high pressure chamber 52 and secondary low pressure chamber 53. Secondary piston 16 also carries a secondary seal 49 that separates secondary low pressure chamber 53 from primary high pressure chamber 50 within the longitudinal bore 20. The secondary piston 16 is operable to selectively pressurize a braking circuit 22, through the outlet opening 45.

Master cylinder body 12 includes integrally formed bosses 18 and 19 which are adapted for connection to fluid reservoir 9 but which, in the present invention, receive boost valve 11. A transverse bore 23 extends into boss 18 and a transverse bore 24 similarly extends into boss 19. A compensation port 25 provides an opening between transverse bore 24 and longitudinal bore 20 between seal 33 and the seal 36. A bypass hole 26 provides an opening between transverse bore 24 and longitudinal bore 20 into primary high pressure chamber 50. Similarly, a compensation port 27 provides an opening between transverse bore 23 and longitudinal bore 20 into secondary low pressure chamber 53. Additionally, a bypass hole 28 provides an opening between transverse bore 23 and longitudinal bore 20 into secondary high pressure chamber 52. The compensation ports 25 and 27 and the bypass holes 26 and 28 provide fluid routes between the boost valve 11 and the bore 20 of master cylinder body 12.

A stationary bulkhead 29 is also positioned in the longitudinal bore 20 of the master cylinder assembly 10. The stationary bulkhead 29 includes an annular element 30 that carries an exterior seal 33 which sealingly engages the stationary bulkhead 29 and the master cylinder body 12 within the longitudinal bore 20. The annular element 30 also carries an internal seal 32 that is sealingly engaged between the stationary bulkhead 29 and the shaft 37 of primary piston 14. The stationary bulkhead 29 and the primary piston 14 define a boost chamber 55 within the longitudinal bore 20 which is fluidly sealed by the seals 32, 33 and 36. The boost chamber 55 is open through the compensation port 25 to the passage 65 of boost valve assembly 11.

The stationary bulkhead 29 also includes a cylindrical element 31 which extends from the annular element 30 and which engages the retaining ring 47 that maintains the internal components within the bore 20 of the master cylinder assembly 10. Three set screws 43 are added which extend through the master cylinder body 12 and engage the cylindrical element 31 of stationary bulkhead 29 to lock the stationary bulkhead 29 in position within the longitudinal bore 20. Accordingly, the stationary bulkhead 29 does not slide when the operator applies force to the push rod 15 through the brake pedal 17. The stationary bulkhead 29 includes a counterbore 51 which is formed coaxially about the shaft 37.

The boost valve assembly 11 includes cylindrical extensions 57 and 58 which carry seals 119 and 120 and which are received within bosses 18 and 19 whereby the boost valve assembly 11 is engaged with the master cylinder body 12 in a fluid tight manner. A pair of pins 61 extend through the boss 19 and the cylindrical extension 58 locking the boost valve assembly 11 to the master cylinder body 12.

The valve body 56 of the boost valve assembly 11 includes a longitudinal bore 66 which extends completely therethrough. The valve body 56 also includes a reservoir port 59 and a reservoir port 60. The reservoir 9 includes bayonets 70 and 71 which carry seals 72 and 73 and which are received within the reservoir ports 59 and 60 so that the passages 62 and 63 are placed in open fluid communication with the interior of the reservoir 9. The passages 62 and 63 open to the longitudinal bore 66 and an additional pair of passages 64 and 65 which also open to the longitudinal bore 66 extend through the extensions 57 and 58 of the valve body 56. The passages 64 and 65 open to the longitudinal bore 20 of the master cylinder assembly 10 through the compensation ports 27 and 25 and the bypass holes 28 and 26, respectively.

An annular stop 67 is integrally formed from the valve body 56 within the longitudinal bore 66, or is optionally formed as a separate piece and retained therein. A plug 74 is threaded into the longitudinal bore 66 and is sealingly engaged therein by a seal 77 that is carried about extension 76 of plug 74 which also abuts the annular stop 67. A cylindrical valve body 83 is received within the bore 66 and also abuts the annular stop 67.

A plug 75 is threaded into the bore 66 and is sealingly engaged with the valve body 56 by seal 80. The plug 75 includes a head 81 that is sealingly engaged with the valve body 83 by seal 82. The valve body 83 is thereby, locked in position in the bore 66 between plug 75 and annular stop 67. The head 81 is formed on extension 79 of plug 75. An axial bore 84 is formed through the valve body 83. Transverse bores 121–125 are also formed through the valve body 83 and intersect the axial bore 84.

Figure 2:
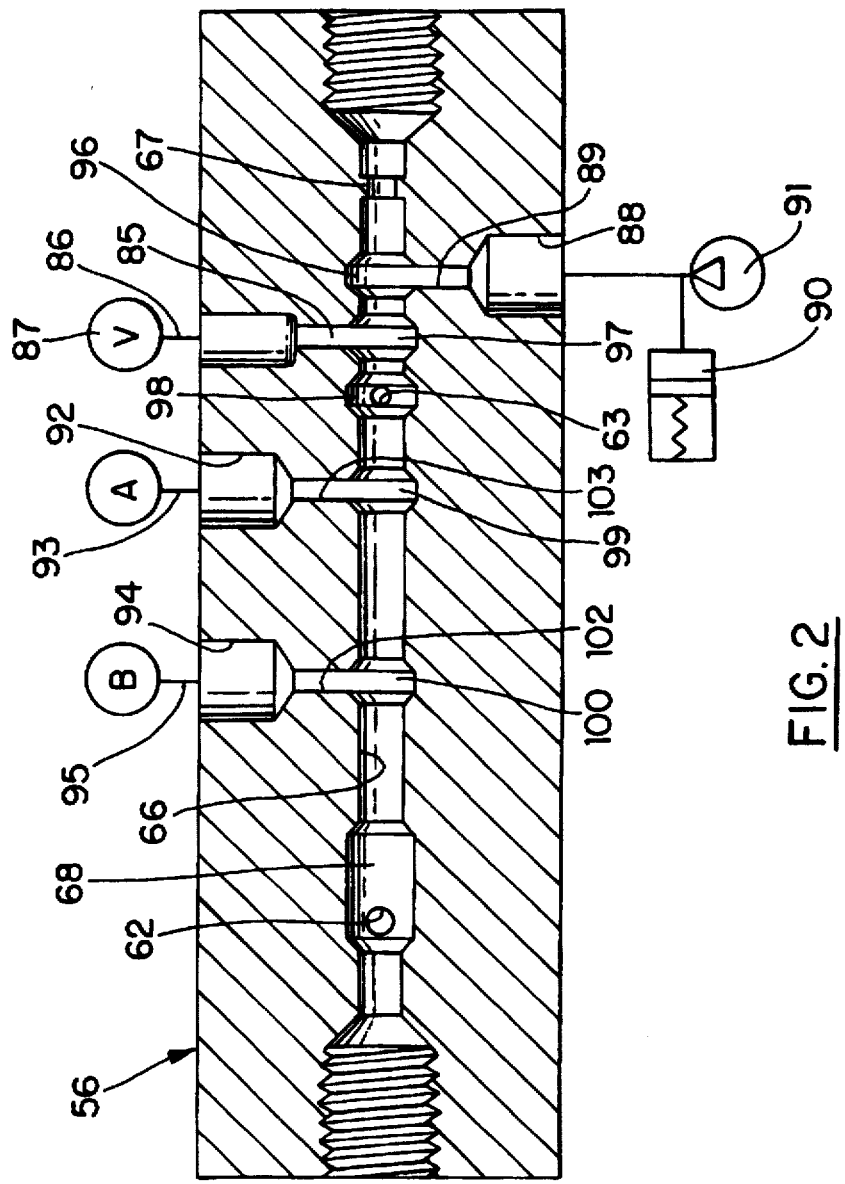
FIG. 2 is a fragmentary cross sectional illustration through the boost valve assembly shown in FIG. 1 and taken generally through the plane indicated by the line 2—2 with the components of the boost valve assembly normally carried in the longitudinal bore thereof being removed.

Referring to FIG. 2, the transverse bore 121 forms part of the passage 89 which communicates between the axial bore 84 at chamber 96 and the supply port 88. A pump 91 and accumulator 90 provide a continuously available supply of pressurized fluid through the supply port 88 to the boost valve assembly 11. The transverse bore 122 forms part of the passage 85 which extends between the axial bore 84 at chamber 97 and the bleed port 86. A bleed valve 87 is connected to the bleed port 86.

The transverse bore 123 forms part of the passage 63 that extends to the reservoir port 60 from the axial bore 84 at chamber 98. The transverse bore 124 forms part of the passage 103 which extends between the axial bore 84 at chamber 99 and control port 92. Control port 92 is connected through conduit 93 to braking circuit 21 as illustrated in FIG. 1. Transverse bore 125 forms part of passage 102 which extends through chamber 100 of axial bore 84 and control port 94. Control port 94 is connected through conduit 95 to braking circuit 22 as illustrated in FIG. 1. Longitudinal bore 84 also includes chamber 68 which is open through passage 62 to reservoir port 59.

The valve body 83 carries a seal 106 that sealingly bears against the valve body 56 and provides fluid separation between the chamber 96 and the chamber 69 that is formed within the bore 78 of plug 74 and within the axial bore 84 about the annular stop 67. The valve body 83 also carries a seal 107 that bears against the valve body 56 within the longitudinal bore 66 and provides fluid separation between the chambers 96 and 97. The seal 108 is carried by valve body 83 and bears against the valve body 56 providing fluid separation between the chambers 98 and 99. The seal 109 is carried by valve body 83 and bears against valve body 56 providing fluid separation between the chambers 99 and 100. The seal 110 is carried by valve body 83 and bears against valve body 56 providing fluid separation between the chambers 100 and 68.

The axial bore 84 carries primary spool 104 and secondary spool 105. The primary spool 104 includes an extension 115 that is engagable with the secondary spool 105. The secondary spool 105 includes an extension 118 that is engagable with the head 81 of plug 75. A spring 111 extends between the primary spool 104 and the plug 74 within bore 78 biasing the primary spool 104 into engagement with the secondary spool 105 and in-turn, biasing the secondary spool 105 into engagement with the plug 75.

The primary spool 104 carries a seal 114 near the extension 115 that sealingly bears against the valve body 83 within the axial bore 84. The secondary spool 105 carries a seal 117 near the extension 118 that sealingly bears against the valve body 83 in the axial bore 84.

An undercut 116 is formed in the primary spool 104 which, as shown in FIG. 1, provides an open communication route between chamber 98 and chamber 97 when the boost valve assembly 11 is in its normal position. A bore 112 extends into the primary spool 104 from end 126. A cross bore 113 intersects the bore 112 and passes through the primary spool 104 within the undercut 116.

In operation, when the primary piston 14 of master cylinder assembly 10 is caused to slide to the left, as viewed in FIG. 1, by means of the manual application of force to the brake pedal actuator 17 as transmitted through the push rod 15, a fluid pressure results in primary high pressure chamber 50. The fluid pressure is communicated through outlet opening 44 to the braking circuit 21 and from point A to the conduit 93 as viewed in FIG. 2. From conduit 93 fluid pressure is communicated through a control port 92, passage 103 and transverse bore 124 to the chamber 99 about the extension 115 of primary spool 104.

Figure 3:
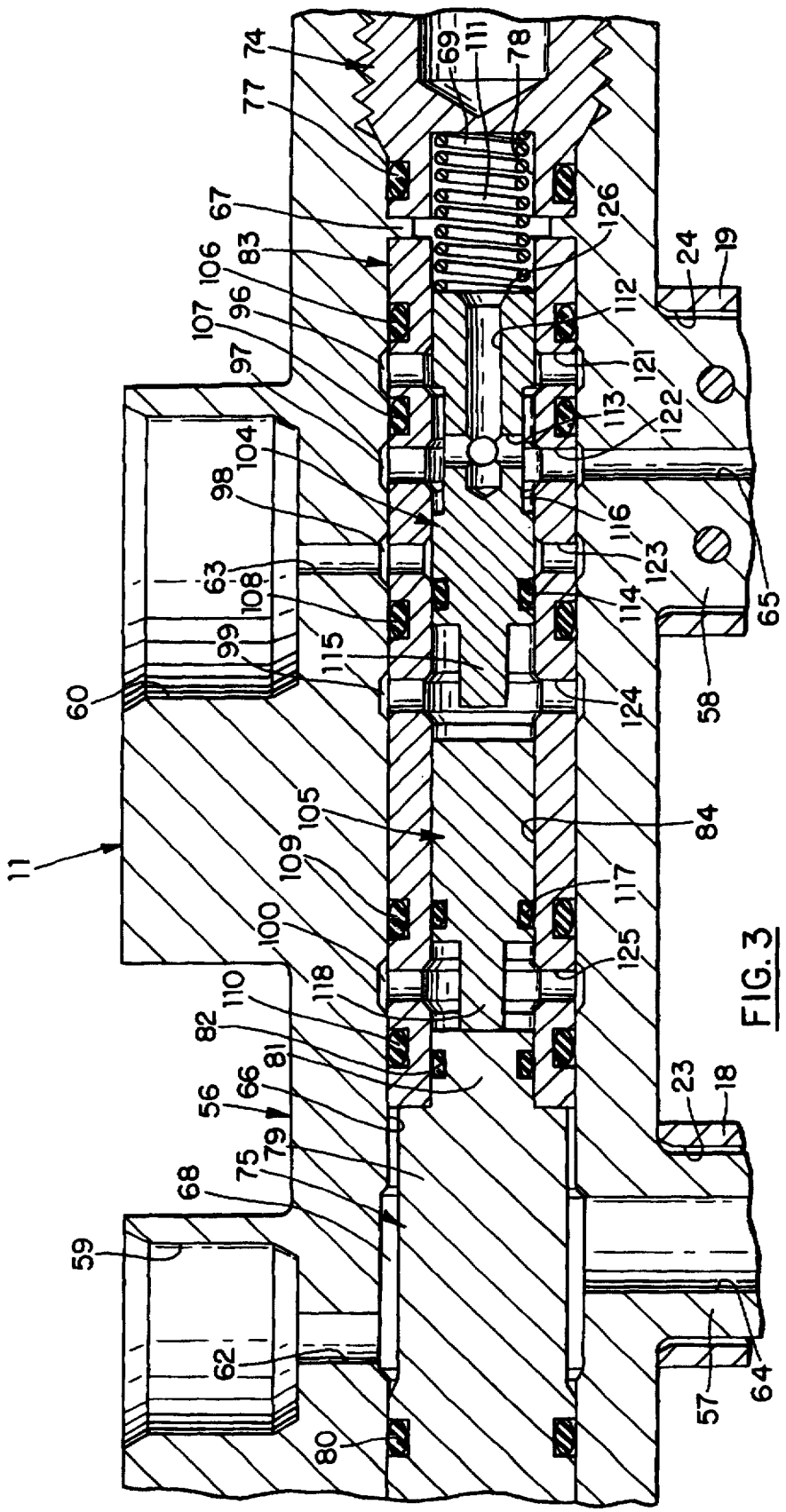
FIG. 3 is a fragmentary detail cross sectional illustration of the power brake apply system of FIG. 1 shown in the primary actuation position.

This causes primary spool 104 to compress the spring 111 and slide within the valve body 83 to the position shown in FIG. 3, and designated as the primary actuation position. As a result, communication is closed off between the fluid reservoir 9 and the boost chamber 55 of master cylinder assembly 10.

As fluid pressure is increased in the primary high pressure chamber 50, the primary spool 104 is caused to compress spring 111 to the extent that a communication path is established between chamber 97 and chamber 96 through the boost valve assembly 11. This permits the communication of pressurized fluid from the accumulator 90, as supplied by the pump 91, through the passage 65 and compensation port 25 to the boost chamber 55 of master cylinder assembly 10. The pressurized fluid source as transmitted to the boost chamber 55, provides a power assist to movement of the primary piston 14 within the longitudinal bore 20 of master cylinder assembly 10. Therefore, the generation of fluid pressure within the primary high pressure chamber 50 and the secondary high pressure chamber 52 results from the manual actuation of the system through operation of the brake pedal actuator 20 and is provided with power assist from the pump 91.

The primary spool 104 is provided with a balancing of forces between the end including extension 115 and the end 126 adjacent spring 111 by means of the cross bore 113 and bore 112 which communicate the pressure at chamber 97 to the chamber 69. The primary spool 105 is balanced by the interrelated fluid forces acting at each end thereof and accordingly, regulates the boost pressure supplied to the boost chamber 55. Pressure in the boost chamber 55 acts on the primary piston area minus the area of the cross section of extension 37, as offset by the bulkhead 29.

When the manual actuation of force is relieved from the brake pedal actuator 17, the primary piston 14 is returned to its at-rest position as illustrated in FIG. 1, by the springs 39 and 42 of the master cylinder assembly 10. This reduces the pressure in the braking circuits 21 and 22 and accordingly, the primary spool 104 of boost valve assembly 11 is returned to its at-rest position as illustrated in FIG. 1 by the spring 111. This reestablishes communication through the boost valve assembly 11 between the boost chamber 55 and the reservoir 9 allowing fluid to return to the reservoir 9.

Figure 4:
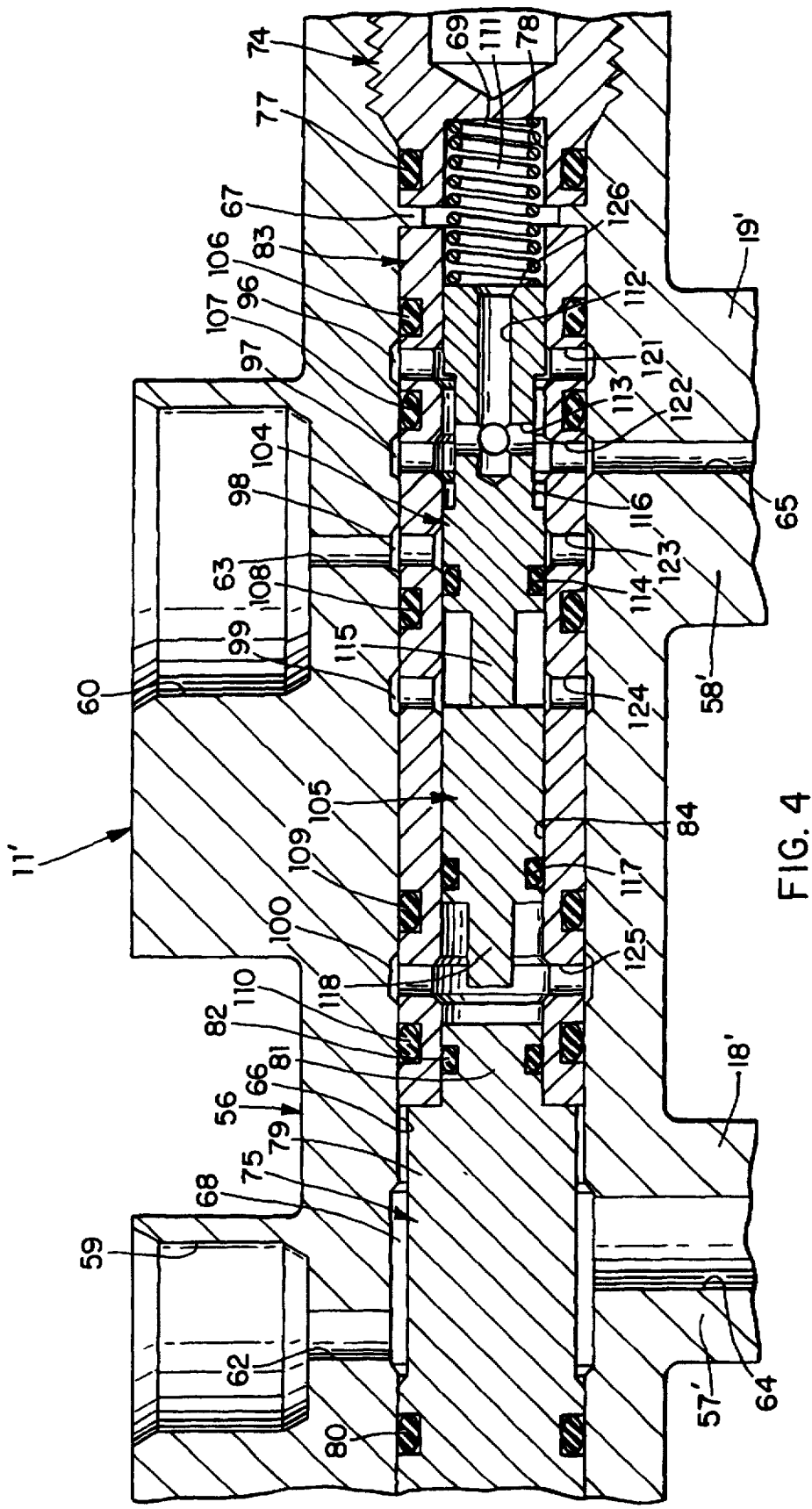
FIG. 4 is a fragmentary detail illustration of a power brake apply system shown in the secondary actuation position and also showing an optional feature of the present invention.

Referring to FIG. 4, a secondary actuation function of the power brake apply system 8 is illustrated wherein, should fluid pressure generated by the primary piston 14 fail to result in translation of the primary spool 104 within the boost valve assembly 11, boost pressure is still established in boost chamber 55. In response to the translation of primary piston 14 as a result of the actuation of brake pedal 17, the secondary piston 16 translates within the bore 20 of master cylinder assembly 10 such as to compress the spring 42 and create an increased pressure in the secondary high pressure chamber 52.

This created pressure is communicated to the outlet opening 45 to the braking circuit 22 and from point B to conduit 95 as viewed in FIG. 2. From conduit 92 the increased pressure is transmitted through the control port 94 to the chamber 100 of boost valve assembly 11. Within chamber 100 the pressure acts on the end of secondary spool 105 about the extension 118. This results in translation of the secondary spool 105 and the primary spool 104 within the axial bore 84 compressing spring 111. As a result, fluid communication is effected between the accumulator 90, as supplied from pump 91, and the boost chamber 55 of master cylinder assembly 10 in substantially the same manner as the means of primary actuation of the power brake apply system 8.

FIG. 4 also illustrates an alternative option of the present invention wherein the valve body 56 of boost valve assembly 11 is integrally formed as one piece with the body 12 of master cylinder assembly 10. Boost valve extensions 57' and 58' are commonly formed with master cylinder bosses 18' and 19'.

Through means of the present invention a means of supplying a fluid pressure from a pre-charged accumulator to provide power assist in the actuation of a master cylinder is effected through a valve assembly that is intimately associated with the master cylinder itself. This results in an integration of the hydraulic boost control and the master cylinder apply functions into a single unit with a common operating fluid.

What is claimed is:

1. A power brake apply system comprising:

a master cylinder including a master cylinder body having a bore with a piston slidably carried in the bore, the master cylinder body having a high pressure chamber in the bore on a first side of the piston and a boost chamber in the bore on a second side of the piston;

a boost valve assembly adjacent the master cylinder body, the boost valve assembly having a valve body carrying a slidable spool wherein the slidable spool has a first end and a second end;

a reservoir engaging the boost valve assembly; and a brake line opening to the bore of the master cylinder on the first side of the piston and opening to the valve body on the first end of the spool;

wherein a first passage extends into the boost valve assembly and opens to the reservoir and a second passage extends into the boost valve assembly and opens to the bore of the master cylinder, the first passage normally being open through the valve body to the second passage and wherein movement of the piston communicates fluid pressure through the brake line to move the spool wherein the spool closes off the first passage from the second passage.

2. A power brake apply system according to claim 1 further comprising a third passage extending through the valve body and opening to a pump wherein movement of the spool opens the third passage to the second passage to pressurize the boost chamber.

3. A power brake apply system comprising:

a master cylinder including a master cylinder body having a bore with a piston slidably carried in the bore, the master cylinder body having a pressure chamber in the bore on a first side of the piston and a boost chamber in the bore on a second side of the piston;

a boost valve assembly adjacent the master cylinder body, the boost valve assembly having a valve body carrying a primary spool wherein the primary spool has an undercut and a first extension;

the boost valve assembly having a passage opening at the undercut and extending to the master cylinder wherein the passage communicates with the bore of the master cylinder and is openable to the pressure chamber;

the valve body carrying a secondary spool having a second extension the secondary spool being engageable by the first extension of the primary spool; and a spring biasing the primary spool toward the secondary spool wherein the primary spool includes a cross bore opening at the undercut and a longitudinal bore intersecting the cross bore and opening to a blind chamber.

4. A power brake apply system comprising:

a master cylinder including a master cylinder body having a bore with a piston slidably carried in the bore, the master cylinder body having a pressure chamber in the bore on a first side of the piston and a boost chamber in the bore on a second side of the piston;

a boost valve assembly adjacent the master cylinder body, the boost valve assembly having a valve body carrying a primary spool wherein the primary spool has an undercut and a first extension and wherein the primary spool includes a cross bore opening at the undercut and a longitudinal bore intersecting the cross bore and opening to a blind chamber, the valve body carrying a secondary spool having a second extension, the secondary spool being engageable by the first extension of the primary spool;

a spring biasing the primary spool toward the secondary spool; and a pump providing a fluid pressure source, wherein the valve body has a first chamber defined radially around the second extension, a second chamber defined radially around the first extension and third, fourth and fifth chambers each defined radially around the primary spool, wherein the pump is in constant fluid communication with the fifth chamber, wherein the undercut is positionable in registry with each of the third fourth and fifth chambers to selectively provide communication through the undercut between the third and the fourth chambers so that the bore of the master cylinder is open to the reservoir through the boost valve assembly, and to provide communication between the fourth and the fifth chambers so that the boost chamber in the master cylinder is open to the pump.

5. A power brake apply system according to claim 4 wherein upon selective movement of the piston in the bore of the master cylinder a first pressure is generated in the pressure chamber and communicated to a first conduit wherein the first conduit is open to the second chamber so that the first pressure is communicated to the valve body about the extension of the primary spool causing the primary spool to move to open the fourth chamber to the fifth chamber across the undercut opening the boost chamber to the pump to provide power assist in movement of the piston.

6. A power brake apply system according to claim 5 further comprising a secondary piston carried in the bore of the master cylinder the secondary piston being selectively moveable to generate a second pressure wherein the second pressure is communicated through a conduit to the first chamber wherein the second pressure operates on the secondary spool about the second extension wherein the second pressure is operable to move the secondary spool and the primary spool within the valve body compressing the spring.

7. A power brake apply system according to claim 6 wherein the master cylinder and the spool valve assembly have a commonly formed body.

8. A power brake apply system to provide wheel brake pressurization comprising:

a master cylinder and a power booster that operate with a common fluid supplied by a single reservoir carried by the power booster wherein the master cylinder includes a master cylinder bore that slidably carries a piston that separates out a boost chamber from a pressure chamber in the master cylinder bore, wherein when the master cylinder is in an unactuated position, a bypass hole intersects the master cylinder bore on a pressure chamber side of the piston and a compensation port intersects the master cylinder bore on a boost chamber side of the piston;

wherein the power booster includes a boost valve assembly that includes an axial bore that is open to the master cylinder master cylinder bore through a first passage that registers with both the bypass hole and the compensation port, wherein the boost valve assembly includes a slidable spool having a first end and a second end with an undercut formed between the first and second ends, with a cross bore extending through the slidable spool at the undercut and a longitudinal bore intersecting the cross bore and extending out through the second end of the slidable piston;

wherein the boost valve assembly includes a second passage that opens to the reservoir and the axial bore wherein when the master cylinder is not actuated, the slidable spool is positionable so that the undercut effects registry between the first passage and the second passage so that the master cylinder bore is open to the reservoir through the boost valve assembly wherein a spring biases the piston to an at-rest position forcing any excess fluid from the boost chamber through the compensation port, the first passage, the axial bore about the undercut, and the second passage and into the reservoir; and a wheel brake connected to the pressure chamber of the master cylinder through a brake line circuit wherein the brake line circuit is also connected to the axial bore at the first end of the slidable spool so that when the master cylinder is actuated, the piston forces fluid through the brake line circuit to the first end of the slidable spool moving the slidable spool to close off registry between the first and second passages and to effect registry between the first and a third passage through the undercut, wherein a pump is in open fluid communication with the pressure chamber through the third passage, the axial bore about the undercut, the first passage, the compensation port and the bypass hole to provide pressure assist in moving the piston.

9. A power brake apply system according to claim 8 wherein the master cylinder includes a pair of integrally formed bosses that are designed to receive a pair of bayonets of the reservoir, wherein the pair of bosses receive a pair of cylindrical extensions of the boost valve assembly, wherein the first passage extends through one of the cylindrical extensions, and wherein the pair of bayonets of the reservoir are received in a pair of reservoir ports of the boost valve assembly so that the boost valve assembly is received by the master cylinder, with the reservoir communicates with the master cylinder through the boost valve assembly.

10. A power brake apply system according to claim 8 further comprising a stationary bulkhead positioned in the master cylinder bore on the boost chamber side of the piston wherein the stationary bulkhead includes a cylindrical element that engages a retaining ring so that the stationary bulkhead is retained in the master cylinder bore, and further comprising a set screw that extends through the master cylinder and engages the cylindrical element to lock the stationary bulkhead in position within the master cylinder bore, wherein the stationary bulkhead includes an annular element that carries a first seal that bears against the annular element and the master cylinder within the master cylinder bore, and a second seal that bears against the annular element and a shaft of the piston.

11. A power brake apply system according to claim 8 wherein the axial bore extends completely through the boost valve assembly and wherein an annular stop having a reduced diameter is formed by the boost valve assembly wherein a valve body that forms the axial bore and carries the slidable spool is engageable with the annular stop and wherein a first plug is fixed near a first end of the axial bore against the annular stop.

12. A power brake apply system according to claim 11 wherein the axial bore carries a secondary spool with an extension and wherein the extension is engageable with a head of a second plug that is fixed in the valve body near a second end of the axial bore, wherein the head extends into the axial bore.

* * * * *